(12) United States Patent
Adachi et al.

(10) Patent No.: US 9,344,016 B2
(45) Date of Patent: May 17, 2016

(54) STORAGE MODULE VOLTAGE EQUALIZER, STORAGE DEVICE, AND OPERATING MACHINE

(71) Applicants: SUMITOMO HEAVY INDUSTRIES, LTD., Tokyo (JP); SUMITOMO (S.H.I.) CONSTRUCTION MACHINERY CO., LTD., Tokyo (JP)

(72) Inventors: Shuntaro Adachi, Yokosuka (JP); Jitsutaka Takeo, Chiba (JP); Takashi Umeda, Chiba (JP)

(73) Assignees: Sumitomo Heavy Industries, Ltd., Tokyo (JP); Sumitomo (S.H.I.) Construction Machinery Co., Ltd., Tokyo (JP)

(*) Notice: Subject to any disclaimer, the term of this patent is extended or adjusted under 35 U.S.C. 154(b) by 105 days.

(21) Appl. No.: 14/282,502

(22) Filed: May 20, 2014

(65) Prior Publication Data

US 2014/0346981 A1 Nov. 27, 2014

(30) Foreign Application Priority Data

May 22, 2013 (JP) .................. 2013-107562

(51) Int. Cl.
*H02J 7/04* (2006.01)
*H02P 6/00* (2016.01)
*B60L 11/18* (2006.01)
*H02J 7/00* (2006.01)

(52) U.S. Cl.
CPC ............. *H02P 6/002* (2013.01); *B60L 11/1866* (2013.01); *H02J 7/0016* (2013.01)

(58) Field of Classification Search
USPC .......... 318/139, 440, 442; 320/116, 121, 135; 307/18
See application file for complete search history.

(56) References Cited

U.S. PATENT DOCUMENTS

| | | | | |
|---|---|---|---|---|
| 5,765,671 A * | 6/1998 | Endo | ................... | B60L 11/1874 192/48.2 |
| 7,067,999 B2 * | 6/2006 | Sugano | ................... | E02F 9/128 318/372 |
| 7,364,816 B2 * | 4/2008 | Hisamitsu | ............... | H01M 2/26 429/141 |
| 7,867,750 B2 * | 1/2011 | Haggblom | .............. | B09C 1/002 435/243 |
| 8,125,192 B2 * | 2/2012 | Yoon | ....................... | B60K 6/28 320/104 |
| 8,941,355 B2 * | 1/2015 | Kamata | ................. | H02J 7/0016 320/118 |
| 9,024,972 B1 * | 5/2015 | Bronder | ................ | G06T 19/006 345/633 |
| 2011/0104521 A1 * | 5/2011 | Kishimoto | .......... | B60L 11/1879 429/7 |

FOREIGN PATENT DOCUMENTS

JP 2002-042903 A 2/2002

* cited by examiner

*Primary Examiner* — Rita Leykin
(74) *Attorney, Agent, or Firm* — Squire Patton Boggs (US) LLP

(57) ABSTRACT

A storage module voltage equalizer includes a plurality of voltage equalization circuits that are prepared to correspond to a plurality of storage cells which are arranged to be lined up in a first direction, and equalize an inter-terminal voltage of the plurality of storage cells, and a plurality of mounting substrates that are stacked, in which the plurality of voltage equalization circuits are mounted, in a distributed manner, on the plurality of mounting substrates.

5 Claims, 12 Drawing Sheets

STORAGE MODULE VOLTAGE EQUALIZER, STORAGE DEVICE, AND OPERATING MACHINE

INCORPORATION BY REFERENCE

Priority is claimed to Japanese Patent Application No. 2013-107562, filed May 22, 2013, the entire content of which is incorporated herein by reference

BACKGROUND

1. Technical Field

The present invention relates to a voltage equalizer that equalizes an inter-terminal voltage of each of a plurality of storage cells which are connected in series, a storage device in which the voltage equalizer is placed, and an operating machine in which the storage device is placed.

2. Description of the Related Art

A storage module, which is configured to have a plurality of storage cells connected in series, is placed in a hybrid type operating machine. Examples of the storage cell include an electric double layer capacitor, a lithium ion capacitor, and a lithium ion secondary battery. Voltage equalization circuits (balance circuits), which limit an inter-terminal voltage at or below a predetermined value, are respectively connected to the plurality of storage cells connected in series (related art).

The storage cell disclosed in the related art has a positive electrode terminal and a negative electrode terminal on an upper surface thereof. The plurality of storage cells are arranged to be lined up in a row. One substrate, on which a wiring pattern is formed, is arranged on the plurality of storage cells. The plurality of storage cells are connected in series by the wiring pattern formed on the substrate. The voltage equalization circuits are disposed on the substrate to correspond to the storage cells.

A discharge current that flows in the voltage equalization circuit increases as the inter-terminal voltage of the storage cells increases. Further, the discharge current increases as the temperature of the storage cells increases. In this manner, appropriate discharge corresponding to the temperature of the storage cells is possible, and the life of the storage cells can be extended.

SUMMARY

According to an embodiment of the present invention, there is provided a storage module voltage equalizer including a plurality of voltage equalization circuits that are prepared to correspond to a plurality of storage cells which are arranged to be lined up in a first direction, and equalize an inter-terminal voltage of the plurality of storage cells, and a plurality of mounting substrates that are stacked, in which the plurality of voltage equalization circuits are mounted, in a distributed manner, on the plurality of mounting substrates.

According to another embodiment of the present invention, there is provided a storage device including a plurality of storage cells that are connected in series with each other, a housing that accommodates the storage cells, a plurality of mounting substrates that are accommodated in the housing and are stacked on each other, and voltage equalization circuits that are respectively connected to a pair of terminals of the storage cells and equalize an inter-terminal voltage of the storage cells, in which the plurality of voltage equalization circuits are mounted, in a distributed manner, on the plurality of mounting substrates.

According to yet another embodiment of the present invention, there is provided an operating machine including a lower traveling body, an upper revolving body that is placed, in a revolvable manner, on the lower traveling body, a slewing motor that revolves the upper revolving body, and a storage device that supplies power to the slewing motor, in which the storage device has a plurality of storage cells that are connected in series with each other, a housing that accommodates the storage cells, a plurality of mounting substrates that are accommodated in the housing and are stacked on each other, and voltage equalization circuits that are respectively connected to a pair of terminals of the storage cells and equalize an inter-terminal voltage of the storage cells, and in which the plurality of voltage equalization circuits are mounted, in a distributed manner, on the plurality of mounting substrates.

DETAILED DESCRIPTION

In the storage device disclosed in the related art, the voltage equalization circuits for the storage cells are disposed in an area of the substrate directly above the respective storage cells. The dimensions of the substrate depend on the length of a cell column that has the plurality of storage cells connected in series. The dimensions of the substrate have to be changed when the number of the storage cells increases and decreases. Accordingly, it is difficult to respond flexibly to the increase and the decrease in the number of the storage cells connected in series.

It is desirable to provide a voltage equalizer that is capable of responding flexibly to an increase and a decrease in the number of storage cells connected in series. It is also desirable to provide a storage device in which the voltage equalizer is placed. It is also desirable to provide an operating machine in which the storage device is placed.

It is possible to respond flexibly to the increase and the decrease in the number of the storage cells since the plurality of mounting substrates are stacked.

One Embodiment

Figure 1:
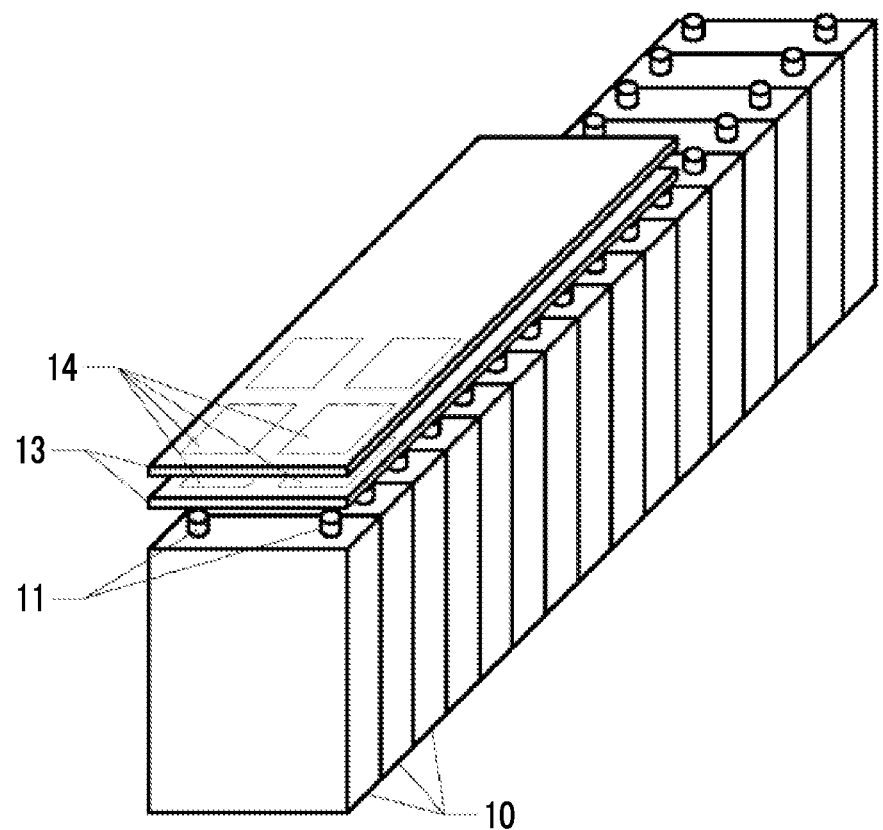
FIG. 1 is a schematic perspective view of a storage device in which a voltage equalizer according to one embodiment of the present invention is placed.

FIG. 1 is a schematic perspective view of a storage device in which a voltage equalizer according to one embodiment of the present invention is placed. A plurality of storage cells 10 can be lined up in one direction. A pair of terminals 11 can be disposed on an upper surface of each of the storage cells 10. One of the pair of terminals 11 can be a positive electrode, and the other one of the pair of terminals 11 can be a negative electrode. The pair of terminals 11 can be arranged, apart from each other, in a direction that is orthogonal to a direction in which the plurality of storage cells 10 are lined up.

A plurality of mounting substrates 13 can be arranged on the plurality of storage cells 10. The plurality of mounting substrates 13 can be stacked, apart from each other, in a thickness direction thereof. A plurality of voltage equalization circuits 14 can be mounted, in a distributed manner, on the plurality of mounting substrates 13. The voltage equalization circuits 14 can be prepared to correspond to the storage cells 10. Each of the voltage equalization circuits 14 can be connected to the pair of terminals 11 of the corresponding storage cell 10.

When an inter-terminal voltage of the storage cells 10 exceeds a specified value, the voltage equalization circuits 14 can lower the inter-terminal voltage by causing a discharge current to flow. In this manner, variations of the inter-terminal voltage of the plurality of storage cells 10 can be reduced, and the inter-terminal voltage can be uniform. Accordingly, application of an excessive voltage to the particular storage cell 10 can be prevented, and deterioration of the storage cells 10 can be suppressed.

The plurality of mounting substrates 13 can be products having the same standards, and the maximum number of the voltage equalization circuits 14 that can be mounted on the respective mounting substrates 13 are equal. In a case where the number of connections of the storage cells 10 exceeds the maximum possible number of placements of the voltage equalization circuits 14 on one of the mounting substrate 13, the plurality of mounting substrates 13 can be arranged such that the voltage equalization circuits 14 equal in number to the storage cells 10 can be prepared. The plurality of mounting substrates 13 have the same standard as one another, and thus it is not necessary to prepare a plurality of mounting substrates that have different standards from one another. Therefore, the number of mounting substrates in stock can be reduced.

Figure 2A:
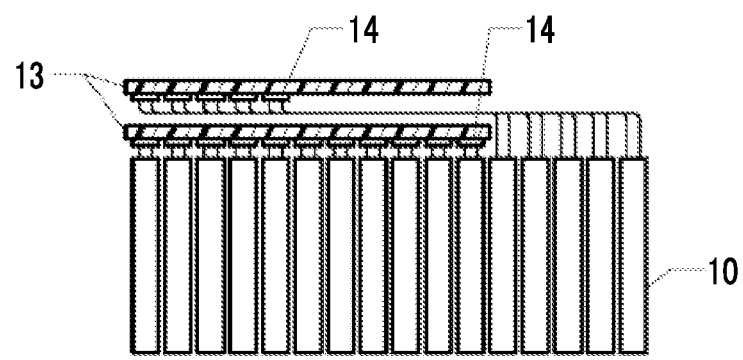
FIGS. 2A and 2B are schematic views showing various configuration examples of the storage device according to the embodiment.

A configuration example of the storage device according to this embodiment of the present invention will be described with reference to FIGS. 2A and 2B. It is assumed that the maximum possible number of placements of the voltage equalization circuits 14 mounted on the single mounting substrate 13 is 11. As shown in FIG. 2A, the two mounting substrates 13 can be arranged in a case where the 16 storage cells 10 are connected. The 11 voltage equalization circuits 14 that correspond to the 11 storage cells 10 can be placed on one of the mounting substrates 13, and the voltage equalization circuits 14 that are connected to the other five storage cells 10 can be placed on the other one of the mounting substrates 13.

Figure 2B:
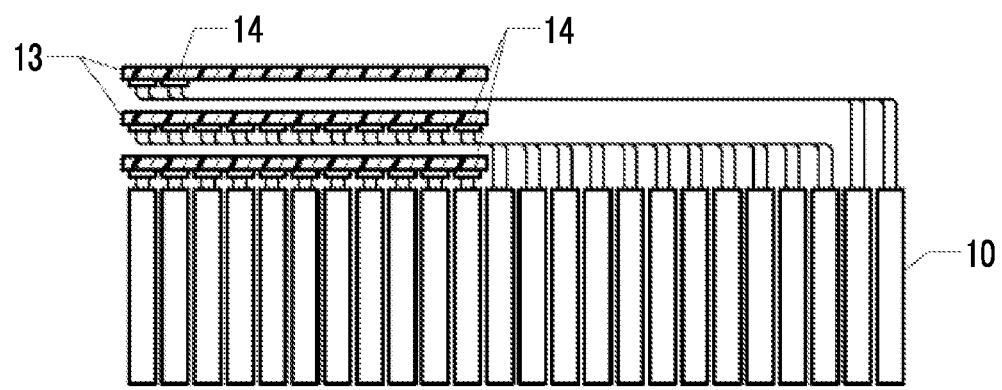

As shown in FIG. 2B, the three mounting substrates 13 can be arranged in a case where the number of connections of the storage cells 10 is increased to 24. The three mounting substrates 13 are stacked on each other. When the storage cells 10 are numbered from one to 24 from left to right in FIG. 2B, the third mounting substrate 13 can be installed above the first to 11th storage cells 10. The voltage equalization circuits 14 that are connected to the first to 11th storage cells 10 can be placed on the lowermost mounting substrate 13. The voltage equalization circuits 14 that are connected to the 12th to 22nd storage cells 10 can be placed on the second-lowest mounting substrate 13. The voltage equalization circuits 14 that are connected to the 23rd to 24th storage cells 10 can be mounted on the uppermost mounting substrate 13.

As shown in FIGS. 2A and 2B, a flexible response to an increase or a decrease in the number of connections of the storage cells 10 can be possible by increasing or decreasing the number of the mounting substrates 13. Further, no new area is required in order to arrange the mounting substrates 13 in a plan view, even when the number of the mounting substrates 13 is increased, since the plurality of mounting substrates 13 are stacked.

Another Embodiment

A storage module voltage equalizer according to this embodiment of the present invention will be described with reference to FIGS. 3A to 6B.

Figure 3A:
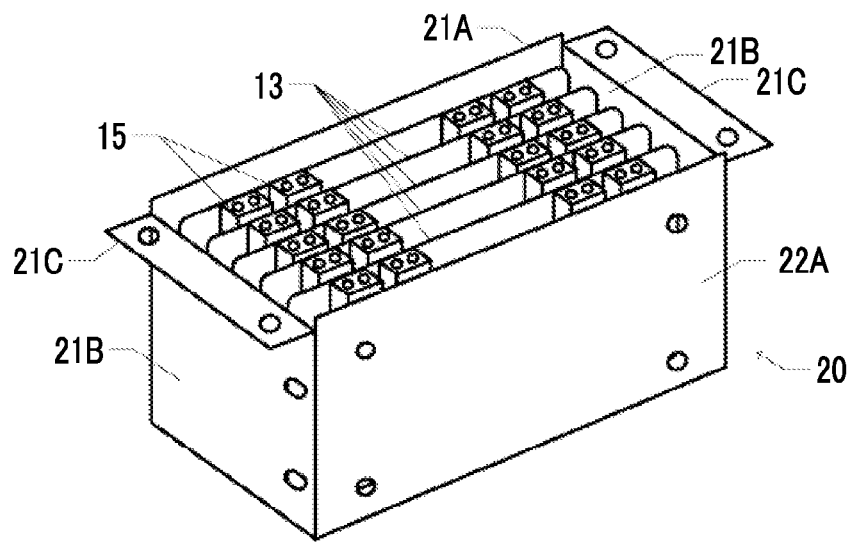
FIG. 3A is a perspective view of a storage module voltage equalizer according to another embodiment.

FIG. 3A is a perspective view of the storage module voltage equalizer according to this embodiment. The voltage equalizer can include the plurality of mounting substrates 13, and an accommodation container 20 that accommodates the mounting substrates 13. The plurality of mounting substrates 13 can be stacked in the thickness direction. A plurality of substrate side connectors 15 can be mounted on each of the mounting substrates 13. The accommodation container 20 can have upper and lower quadrangular opening portions and can have a cylindrical shape. The two opening portions can be directed to be orthogonal to a stacking direction of the mounting substrates 13. Hereinafter, the stacking direction of the mounting substrates 13 will be simply referred to as the "stacking direction" in some cases.

The substrate side connectors 15 can be mounted at a position that allows access through one of the opening portions. Specifically, the substrate side connectors 15 can be mounted in the vicinity of an edge of the mounting substrate 13 directed in the same direction (upward in FIG. 3A) as a direction in which the one opening portion is directed. Insertion openings of the substrate side connectors 15 can be directed upward, and a cable side connector can be inserted, from above, into the substrate side connector 15.

Figure 3B:
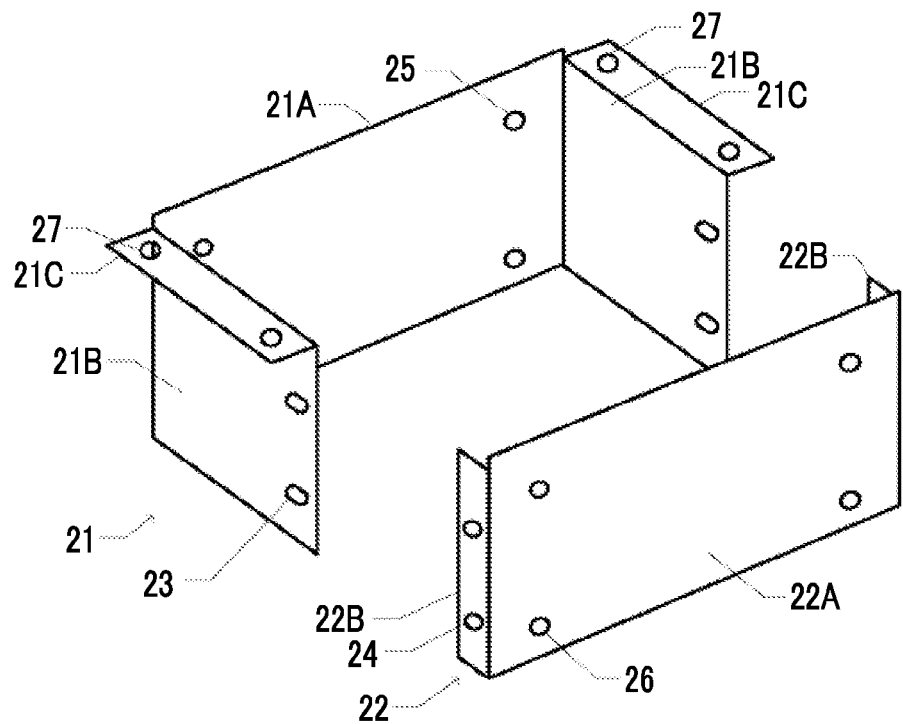
FIG. 3B is an exploded perspective view of an accommodation container.

FIG. 3B is an exploded perspective view of the accommodation container 20. The accommodation container 20 can have a first side surface member 21 and a second side surface member 22. One side surface 21A that is orthogonal to the stacking direction and a pair of side surfaces 21B that are parallel in the stacking direction can constitute the first side surface member 21. An additional side surface 22A that is orthogonal to the stacking direction can constitute the second side surface member 22.

A pair of mounting portions 21C can protrude outward from an edge of an upward opening portion of the accommodation container 20. Specifically, the mounting portions 21C can be formed by bending upper ends of the pair of side surfaces 21B, which are parallel in the stacking direction, by 90° outside.

Superposition portions 22B can be formed by bending both ends of the second side surface member 22 in a direction of the first side surface member 21. The superposition portions 22B can be superposed on a part of the side surfaces 21B of the first side surface member 21. The second side surface member 22 can be fixed to the first side surface member 21 when through-holes 23 that are formed on the side surfaces 21B and through-holes 24 that are formed on the superposition portions 22B are superposed on each other and fastened with a fastening tool.

One of the through-hole 23 and the through-hole 24 can be a long hole that is long in the stacking direction. In this manner, a gap between the pair of the side surfaces 21A and 22A, which are perpendicular to the stacking direction, can be finely adjusted.

A plurality of through-holes 25 can be formed on the side surface 21A, and through-holes 26 can be formed at corresponding positions of the facing side surface 22A. A supporting tool that supports the mounting substrates 13 can be mounted by using the through-holes 25 and 26. Through-holes can be formed in the mounting portions 21C. The through-holes 27 can be used when the accommodation container 20 is mounted on a housing of the storage device.

Figure 4:
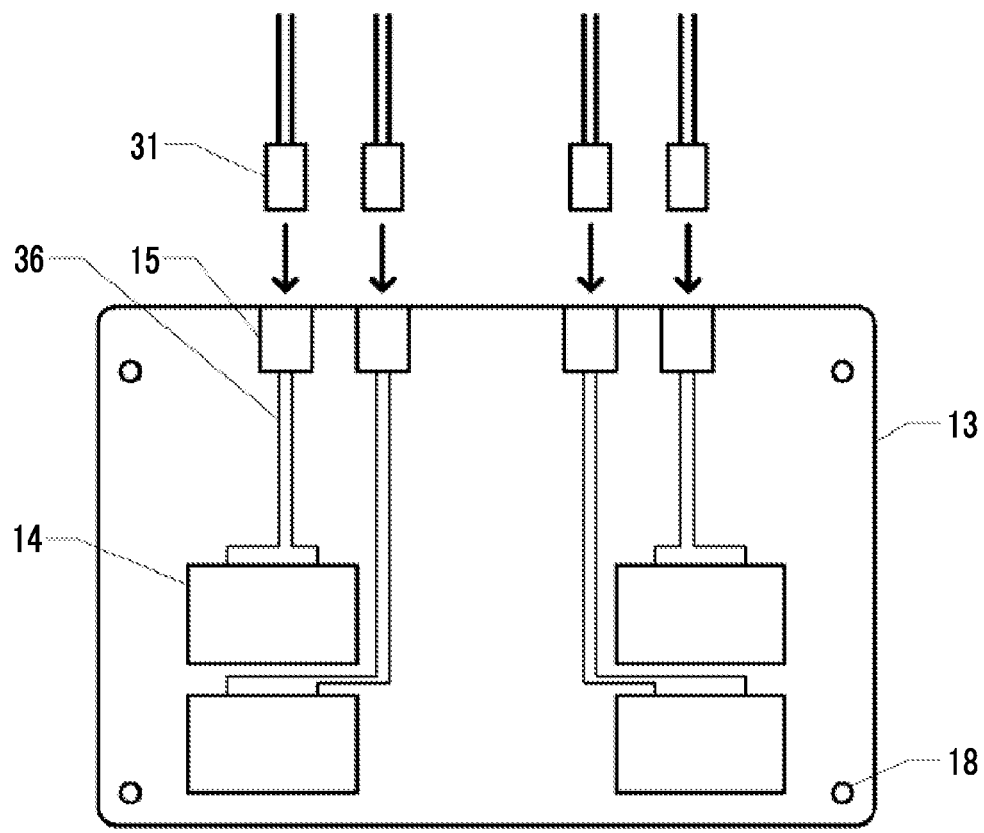
FIG. 4 is a plan view of a mounting substrate.

FIG. 4 is a plan view of the mounting substrate 13. The plurality of substrate side connectors 15 can be mounted in the vicinity of one of the edges of the mounting substrate 13. The substrate side connectors 15 can be fitted into cable side connectors 31. The plurality of voltage equalization circuits 14 can be mounted on the mounting substrate 13. The voltage equalization circuits 14 can be connected to respective terminals of the substrate side connectors 15 via wiring patterns 36 that are formed on the mounting substrate 13.

A plurality of through-holes 18 can be formed in the mounting substrate 13. The through-holes 18 can be arranged at positions that correspond to the through-holes 25 and 26 of the side surfaces 21A and 22A which are shown in FIG. 3B.

Figure 5:
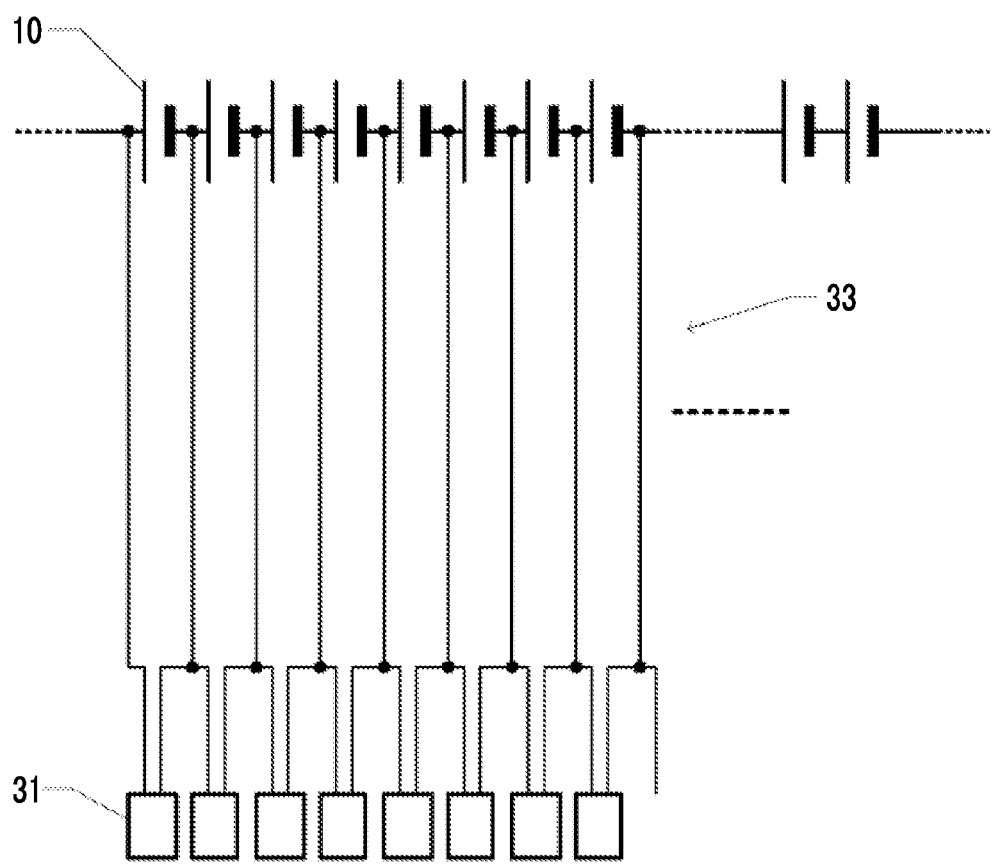
FIG. 5 is a view showing a configuration of connection between a plurality of storage cells and thermistors that are serially connected and cable side connectors.

FIG. 5 shows a configuration of connection between the plurality of storage cells 10 that are connected in series and the cable side connectors 31. The plurality of storage cells 10 can be connected in series. A pair of terminals of the storage cells 10 can be connected to the cable side connectors 31 via cables 33.

Each of the storage cells 10 can be connected to the voltage equalization circuit 14 (FIG. 4) via the cable 33, the cable side connector 31, and the substrate side connector 15 (FIG. 4).

Figure 6A:
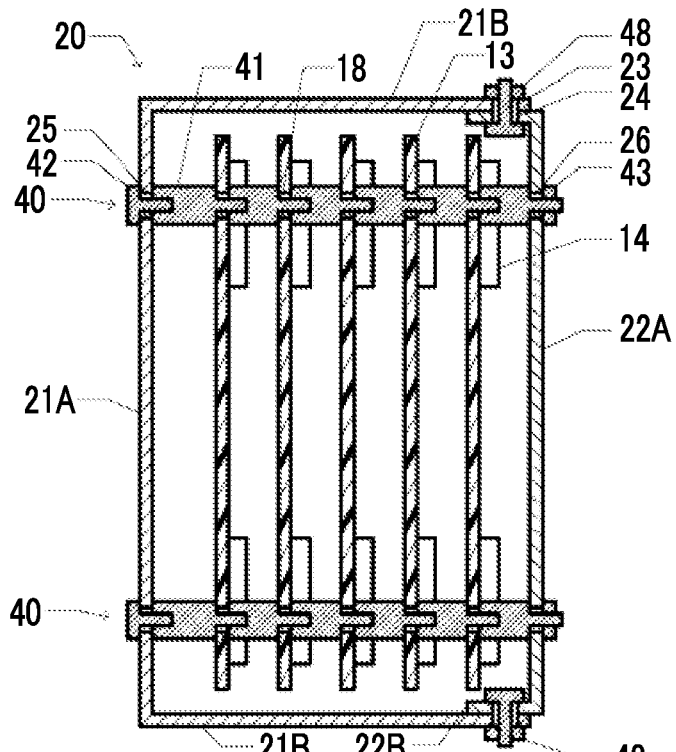
FIG. 6A is a planar cross-sectional view of the storage module voltage equalizer according to the embodiment.

FIG. 6A is a planar cross-sectional view of the storage module voltage equalizer according to this embodiment of the present invention. The plurality of mounting substrates that are stacked in the thickness direction can be accommodated in the accommodation container 20. The voltage equalization circuits 14 can be mounted on the mounting substrates 13. Supporting tools 40 can fix the plurality of mounting substrates 13 into the accommodation container 20. The supporting tool 40 can reach a surface outside the side surface 22A from a surface outside the one side surface 21A through the through-hole 25 of the side surface 21A, the through-hole 18 of the mounting substrate 13, and the through-hole 26 of the facing side surface 22A.

The supporting tools 40 can have male and female type spacers 41 that are respectively arranged between the side surface 21A of the first side surface member 21 and the mounting substrate 13, between the two mounting substrates 13 that are adjacent to each other, and between the side surface 22A of the second side surface member 22 and the mounting substrate 13. The mounting substrates 13 can be fixed into the accommodation container 20 with the male and female type spacer 41 and a bolt 42 and a nut 43 that are mounted at both ends.

The first side surface member 21 and the second side surface member 22 can be fixed to each other when a fastening tool 48 penetrates the through-hole 23 of the side surface 21B and the through-hole 24 of the superposition portion 22B. Variations can result from a dimensional tolerance of the male and female type spacer 41 in the gap between the one side surface 21A and the facing side surface 22A. The variations can be absorbed since one of the through-holes 23 and 24 is the long hole that is long in the stacking direction.

Figure 6B:
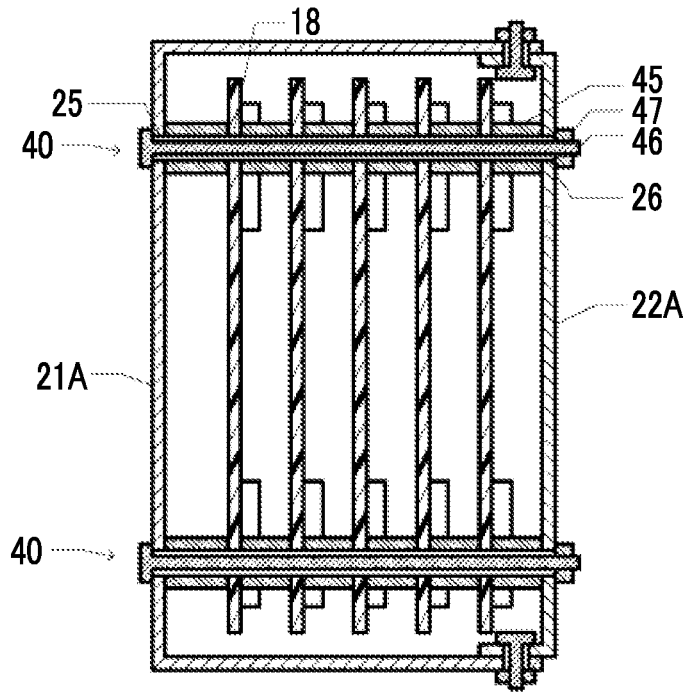
FIG. 6B is a planar cross-sectional view of a storage module voltage equalizer according to a modification example of the embodiment.

FIG. 6B shows another configuration example of the supporting tool 40. In the configuration example that is shown in FIG. 6B, the supporting tool 40 can have a hollow spacer 45, a bolt (tie rod) 46, and a nut 47. The tie rod 46 can reach the surface outside the one side surface 22A from the surface outside the other side surface 21A through the through-hole 25, the hollow spacer 45, the through-hole 18 of the mounting substrate 13, and the through-hole 26.

Further Embodiment

Figure 7A:
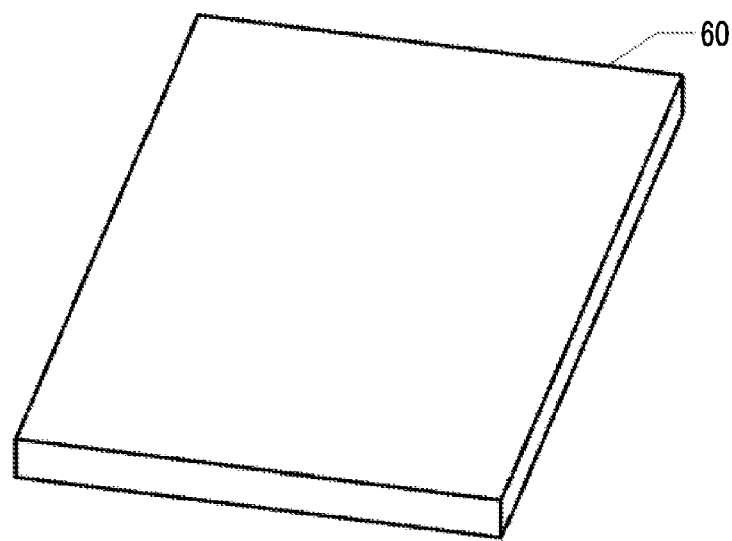
FIGS. 7A and 7B are perspective views respectively showing a lid and a lower housing of a storage device according to further embodiment.
Figure 7B:
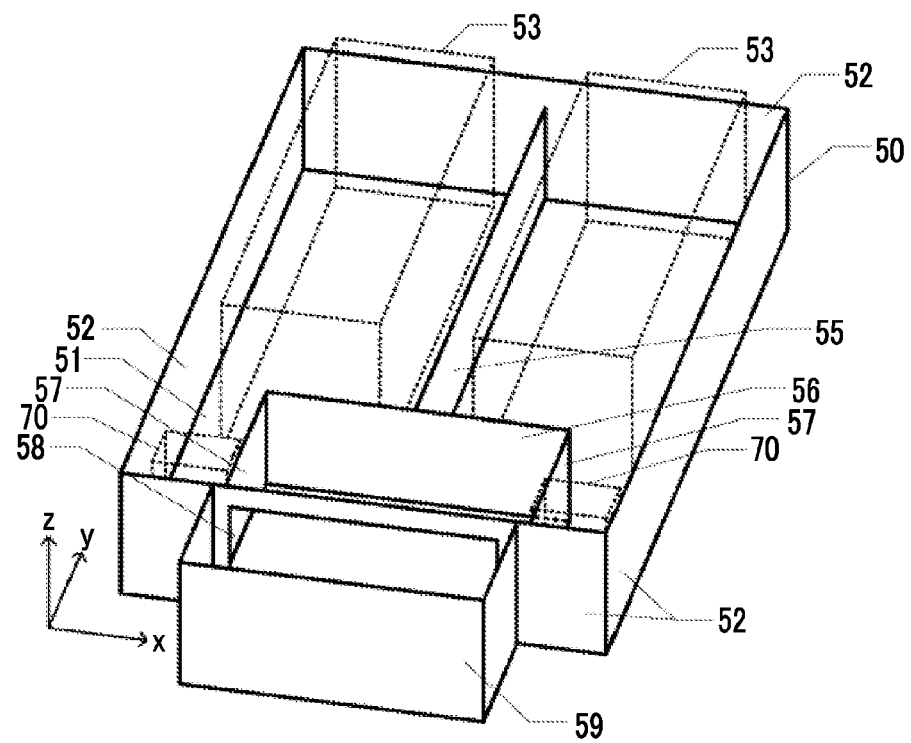

FIGS. 7A and 7B are perspective views respectively showing a lid 60 and a lower housing 50 of a storage device according to further embodiment. As shown in FIG. 7B, the lower housing 50 can have a bottom surface 51 and a side surface 52, and the lower housing 50 can be open upward. The side surface 52 can be arranged over an entire outer circumferential line area of the bottom surface 51. The lid 60 that is shown in FIG. 7A can block the upward open portion of the lower housing 50.

Two storage modules 53 can be placed on the bottom surface 51. An xyz orthogonal coordinate system can be defined, in which a plane that is parallel to the bottom surface 51 is an xy plane and a normal direction of the bottom surface 51 is a z direction. A direction in which the two storage modules 53 are apart is an x direction. Each of the storage modules 53 can have a plurality of storage cells that are stacked in a y direction, and can perform charging and discharging with electric energy. A configuration of the storage module 53 will be described in detail later with reference to FIGS. 8, 9A, and 9B.

A connector box 59 can be disposed on the one side surface 52 that is perpendicular to the y direction. A space in the connector box 59 and a space in the lower housing 50 can communicate with each other via an opening 58. An upward opening portion of the connector box 59 can be blocked by a connector plate on which a connector terminal is arranged.

A first rib 55, a second rib 56, and third ribs 57 can be formed on the bottom surface 51 so as to increase rigidity. The first rib 55 can be arranged between the two storage modules 53, and can extend in the direction (y direction) that intersects with the x direction. One end portion of the first rib 55 can continue to the side surface 52 that faces the connector box 59.

The second rib 56 can continue to the first rib 55 in an end portion of the first rib 55, and can extend in the x direction. The first rib 55 can be connected to a center of the second rib 56. The third rib 57 can extend in the y direction from both ends of the second rib 56, and can reach the side surface 52 on which the connector box 59 is disposed. The opening 58 can be arranged between places where the two third ribs 57 are connected to the side surface 52.

The first rib 55, the second rib 56, and the third ribs 57 can be lower than the side surface 52 on the basis of the bottom surface 51. Gaps can be formed between the first rib 55 and the lid 60, between the second rib 56 and the lid 60, and between the third rib 57 and the lid 60 in a state where the open portion of the lower housing 50 is blocked with the lid 60.

The bottom surface 51, the side surface 52, the first rib 55, the second rib 56, the third rib 57, and the connector box 59 can be integrally molded by a casting method. Aluminum can be used as an example of materials.

A voltage equalizer 70 can be arranged between the third rib 57 and the side surface 52 that is parallel in the y direction. The voltage equalizer (FIGS. 3A to 6B) according to the another embodiment can be used as the voltage equalizer 70.

Figure 8:
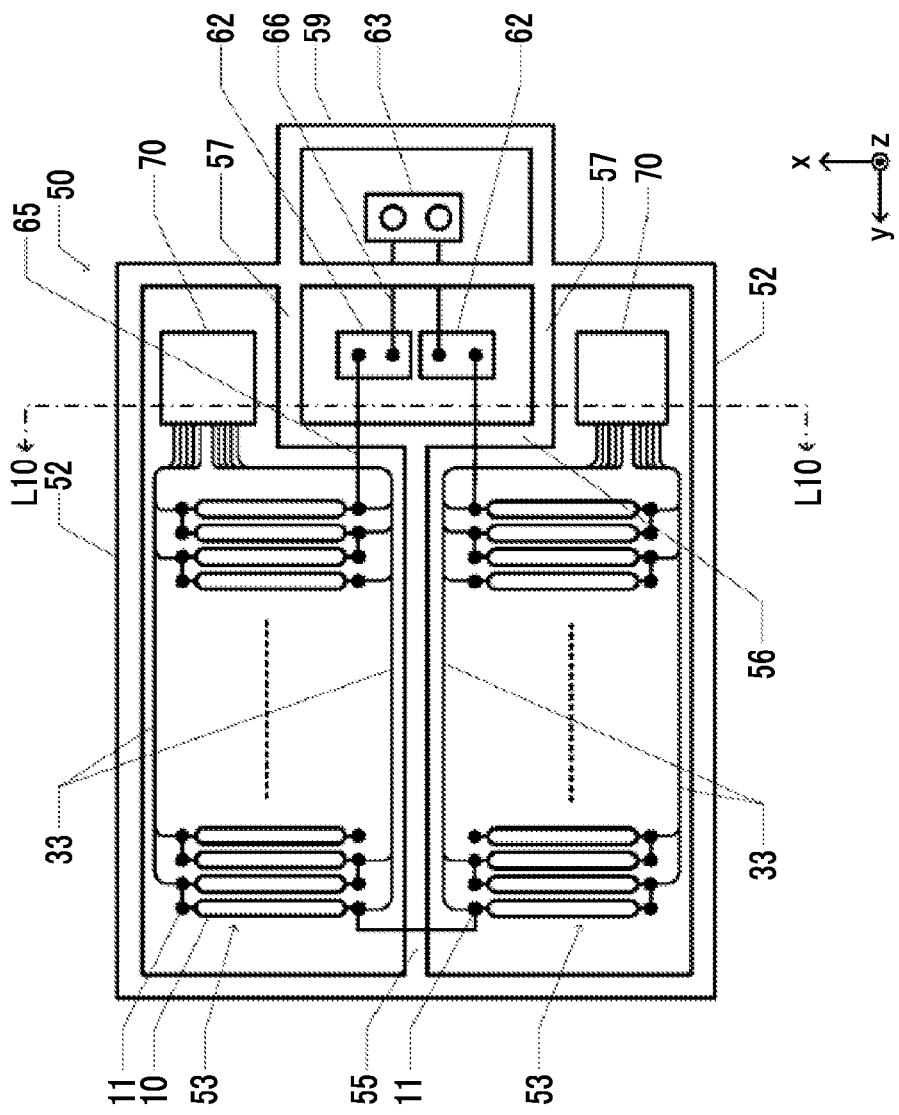
FIG. 8 is a plan view of the lower housing and components that are placed on the lower housing.

FIG. 8 is a plan view of the lower housing 50 and components that are placed on the lower housing 50. The two storage modules 53 can be placed apart from each other in the x direction. The first rib 55 can pass in the y direction between the two storage modules 53. One end portion of the first rib 55 can continue to the side surface 52. The other end portion of the first rib 55 can be positioned on a further outer side than an end portion of the storage module 53 relating to the y direction. The second rib 56 can extend in the x direction from this end portion. The second rib 56 can be partially superimposed on each of the storage modules 53 relating to the x direction. The third rib 57 can extend in the y direction from both of the ends of the second rib 56, and can reach the side surface 52 on which the connector box 59 is disposed.

A pair of relay members 62 can be arranged in an area that is surrounded by the second rib 56, the third ribs 57, and the connector box 59. A relay circuit 63 can be arranged in the connector box 59.

Each of the storage modules 53 can have the plurality of plate-shaped storage cells 10. The plurality of storage cells 10 can be stacked in the thickness direction (y direction) thereof. Each of the storage cells 10 can have the pair of terminals 11 that are derived in the x direction and in opposite directions. The plurality of storage cells 10 can be connected in series. Charging and discharging of the storage module 53 can be performed through the terminals 11 at both ends of series circuits of the plurality of storage cells 10. The terminals 11 at both of the ends far from the connector box 59 can be electrically connected with each other. The pair of terminals 11 may be connected via a fuse.

The terminals 11 at both of the ends close to the connector box 59 can be electrically connected to the respective relay members 62 by bus bars 65. The bus bars 65 can intersect with the second rib 56. The relay members 62 can be connected to the relay circuit 63 by bus bars 66. The bus bars 66 can pass through the opening 58 (FIG. 7B). The voltage equalizer 70 can be placed between the third rib 57 and the side surface 52 that is parallel to the third rib 57. Each of the terminals 11 of the storage cells 10 can be connected to the voltage equalizer 70 via the cable 33.

Figure 9A:
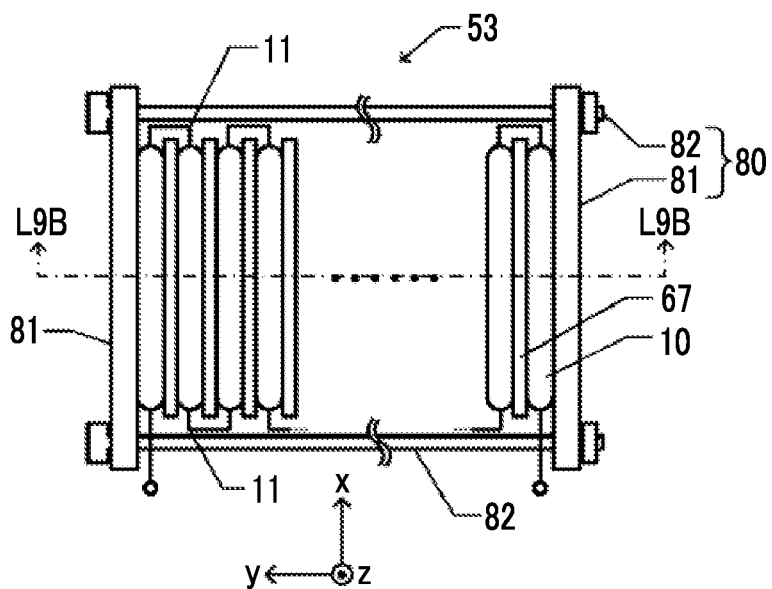
FIG. 9A is a plan view of a storage module.

FIG. 9A is a plan view of the storage module 53. The plate-shaped storage cells 10 and heat exchanger plates 67 are alternately stacked in the thickness direction (y direction). One heat exchanger plate 67 may be arranged with respect to the plurality of, for example, two storage cells 10. The pair of terminals 11 can be drawn out from each of the storage cells 10. The terminal 11 can be connected to the terminal 11 of the next storage cell 10 through an outer side of the heat exchanger plate 67.

A pressurization mechanism 80 can apply a compressive force in the stacking direction to a stacking structure where the storage cells 10 and the heat exchanger plates 67 are stacked. The pressurization mechanism 80 can have pressurization plates 81 that are arranged at both ends of the stacking structure, and a plurality of tie rods 82 that reach one pressurization plate 81 from the other pressurization plate 81. The compressive force in the stacking direction can be applied to the stacking structure of the storage cells 10 and the heat exchanger plates 67 by fastening the tie rods 82 with a nut.

Figure 9B:
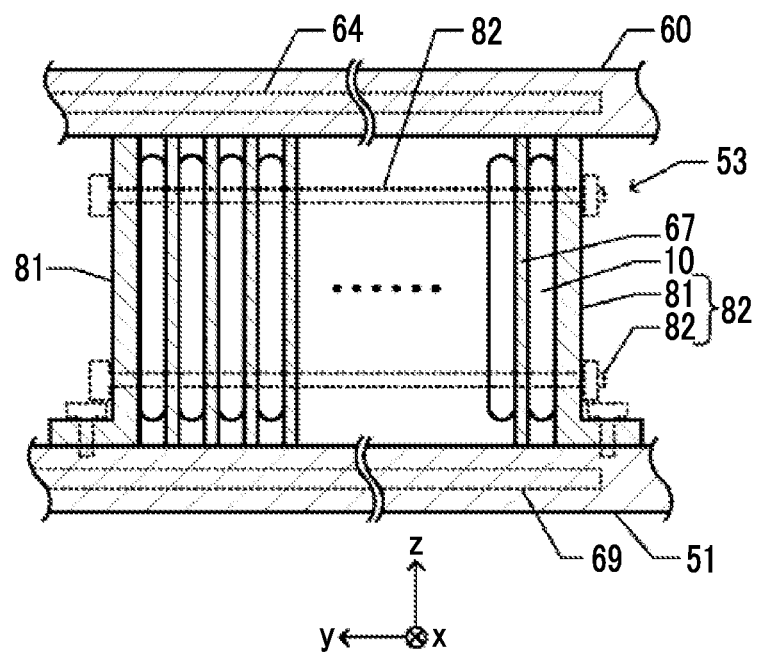
FIG. 9B is a cross-sectional view taken along one-dot chain line L9B-L9B of FIG. 9A.

FIG. 9B is a cross-sectional view taken along one-dot chain line L9B-L9B of FIG. 9A. The pressurization plates 81 can be screwed to the bottom surface 51 of the lower housing 50. A lower end of the heat exchanger plate 67 can be in contact with the bottom surface 51, and an upper end of the heat exchanger plate 67 can be in contact with the lid 60. The lid 60 can be fastened and fixed to the lower housing 50 with a bolt or the like, and can apply a compressive force in the z direction to the heat exchanger plate 67. Due to this compressive force, the storage module 53 can be firmly fixed, in a non-slidable manner, into the housing that has the lower housing 50 (FIG. 1B) and the lid 60 (FIG. 7A). In this manner, reliability can be increased against shocks and vibrations.

A cooling medium flow path 69 can be formed in the bottom surface 51, and a cooling medium flow path 64 can be formed in the lid 60. The storage cell 10 can be cooled via the heat exchanger plate 67 when a cooling medium such as water is allowed to flow in the flow paths 64 and 69.

Figure 10:
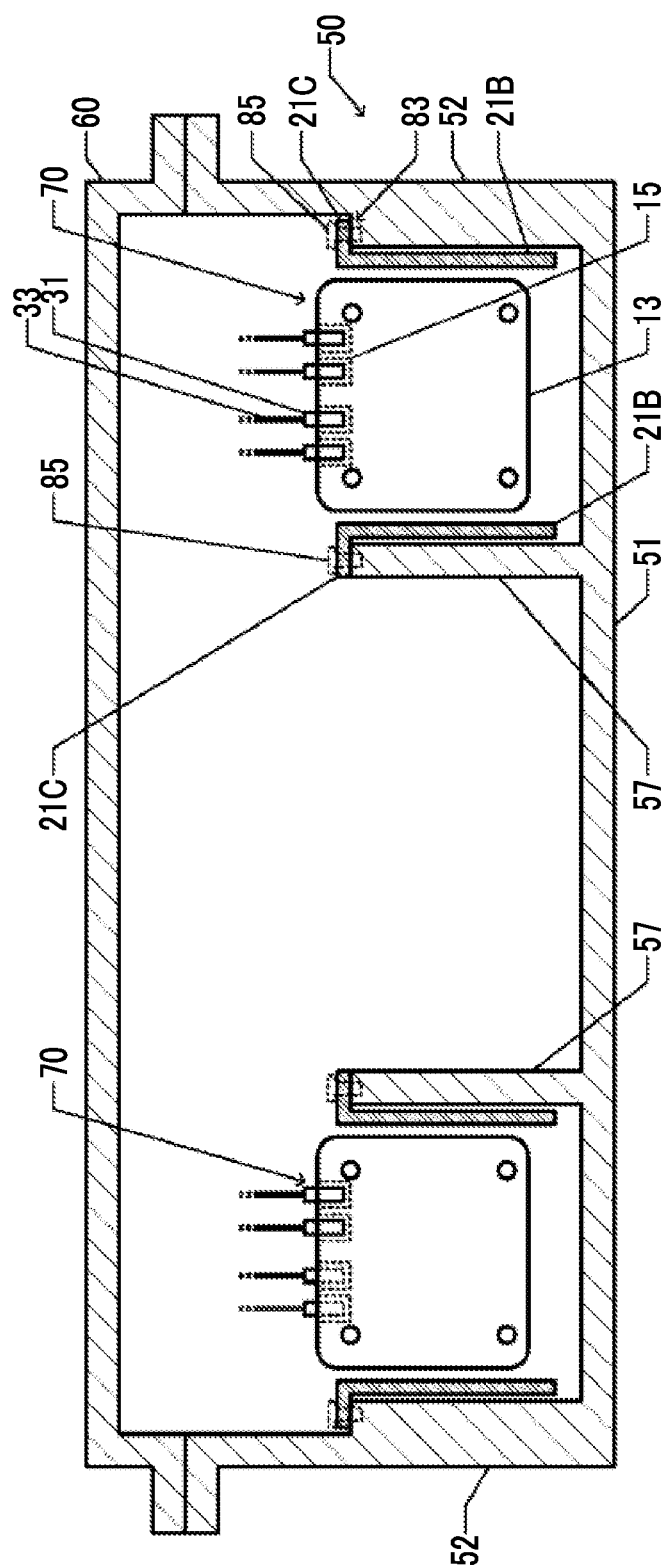
FIG. 10 is a cross-sectional view taken along one-dot chain line L10-L10 of FIG. 8.

FIG. 10 is a cross-sectional view taken along one-dot chain line L10-L10 of FIG. 8. The third ribs 57 can stand upward from the bottom surface 51 of the lower housing 50. A step 83 can be formed on a surface inside the side surface 52. The step 83 can be arranged at the same height as the height of an upper end of the third rib 57. The voltage equalizer 70 can be arranged between the third rib 57 and the side surface 52. The voltage equalizer according to the another embodiment that is shown in FIGS. 3A to 6B can be used as the voltage equalizer 70.

The mounting substrate 13 can be supported between the two side surfaces 21B. The voltage equalizer 70 can be arranged in the lower housing 50 with a posture in which the insertion opening of the substrate side connector 15 is directed upward. The two mounting portions 21C can be respectively supported on upper surfaces of the step 83 and the third rib 57. The accommodation container 20 (FIGS. 3A and 3B) can be fixed to the lower housing 50 by a fastening tool 85 (for example, a bolt) that penetrates the through-holes 27 (FIGS. 3A and 3B) which are formed in the mounting portions 21C. The mounting substrate 13 can be perpendicular to the stacking direction (y direction) of the storage cell 10.

The insertion openings of the substrate side connectors 15 of all of the mounting substrates 13 are directed upward, and thus the cable side connector 31 (FIG. 4) can be easily inserted into the substrate side connector 15 in a state where the voltage equalizer 70 is fixed to the lower housing 50. In this manner, the ease of maintenance can be improved.

Furthermore, as shown in FIG. 3A, the mounting portion 21C can be disposed at the edge of the upward opening portion. In a case where the mounting portion is disposed at an edge of a lower side opening portion and the accommodation container is screwed to the bottom surface 51 (FIG. 10) of the lower housing 50, the components accommodated in the lower housing 50 has to be circumvented in performing the screwing, which can result in poor workability. In contrast, in this embodiment, the mounting portion 21C is disposed at the upper end of the side surface 21B, and thus the workability can be increased when the accommodation container 20 (FIGS. 3A and 3B) is mounted on the lower housing 50.

Yet Further Embodiment

Figure 11:
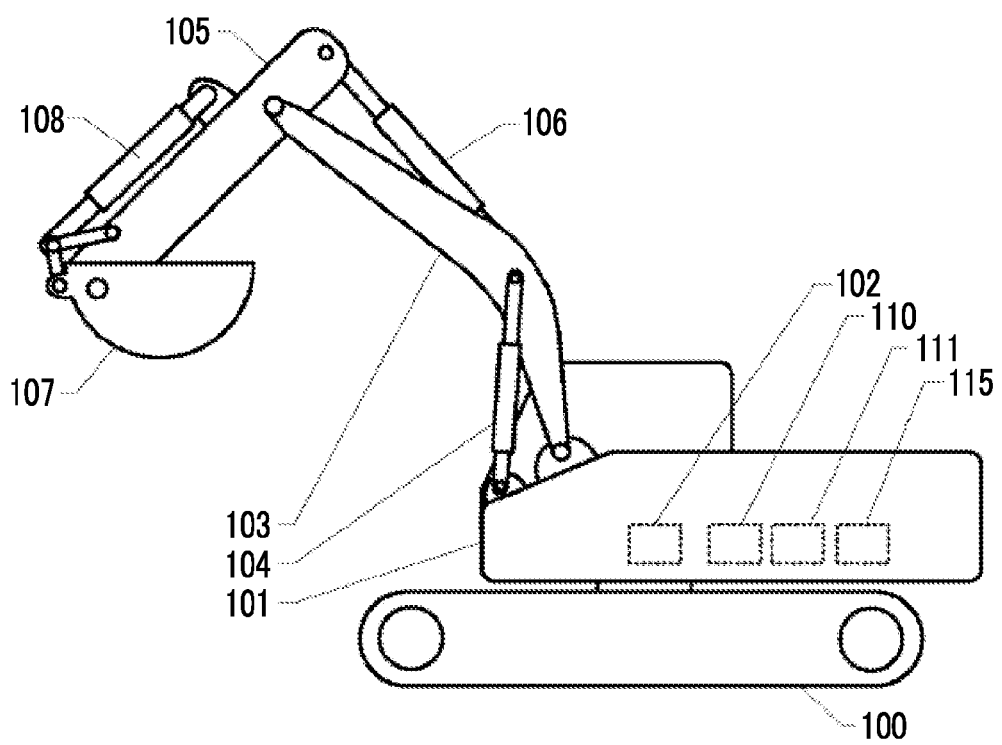
FIG. 11 is a side view of a shovel according to yet further embodiment.

FIG. 11 is a side view of a shovel as an example of an operating machine according to yet further embodiment. An upper revolving body 101 can be placed on a lower traveling body 100. A boom 103 can be connected to the upper revolving body 101, an arm 105 can be connected to the boom 103, and a bucket 107 can be connected to the arm 105. A posture of the boom 103 can be changed when a boom cylinder 104 is expanded or contracted. A posture of the arm 105 can be changed when an arm cylinder 106 is expanded or contracted. A posture of the bucket 107 can be changed when a bucket cylinder 108 is expanded or contracted. The boom cylinder 104, the arm cylinder 106, and the bucket cylinder 108 can be hydraulically driven. A slewing motor 102, an engine 110, a motor generator 111, and a storage device 115 can be placed on the upper revolving body 101.

Figure 12:
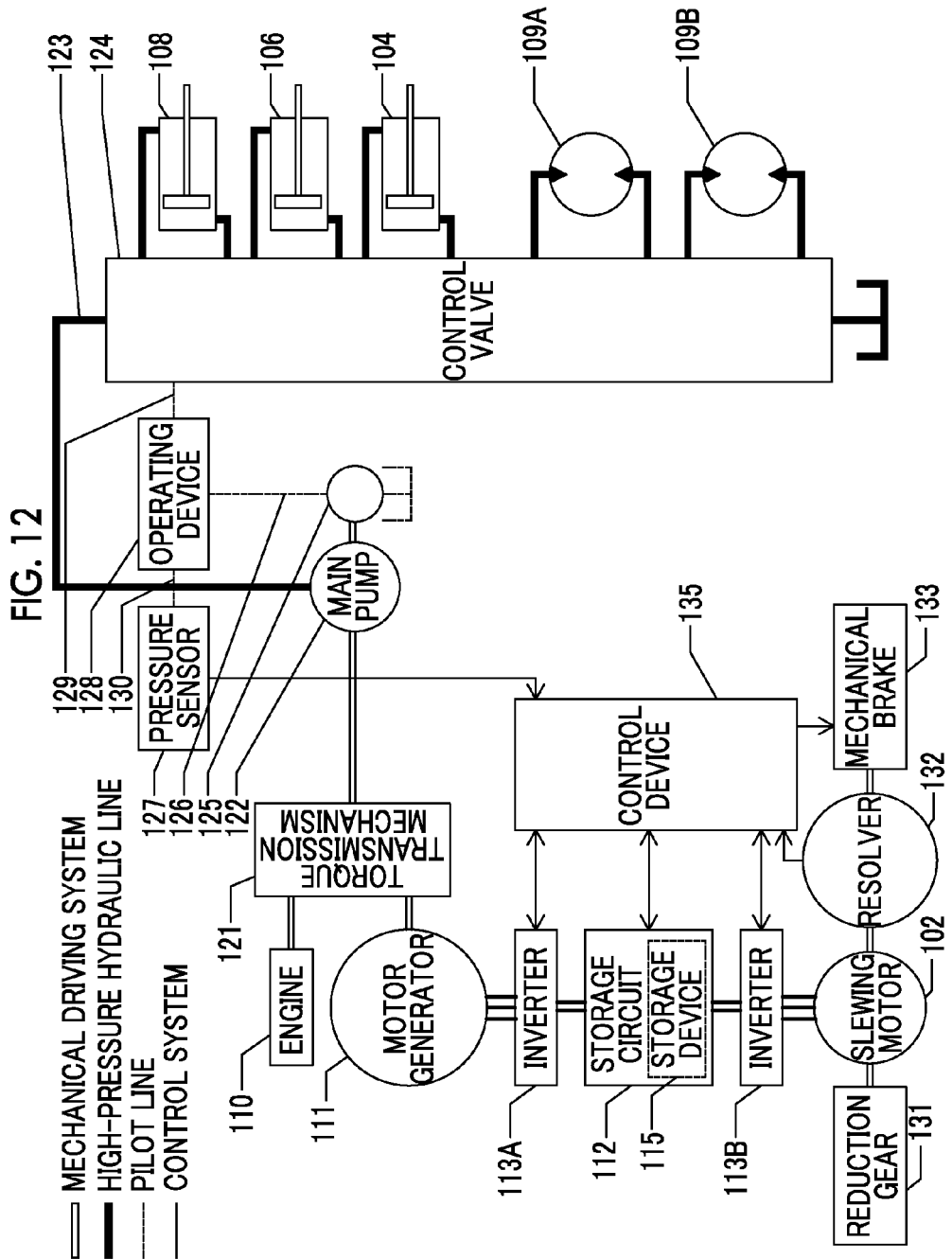
FIG. 12 is a block diagram of the shovel according to the embodiment.

FIG. 12 is a block diagram of the operating machine according to this embodiment of the present invention. In FIG. 12, a mechanical power system is represented by a double line, a high-pressure hydraulic line is represented by a thick solid line, an electric control system is represented by a thin solid line, and a pilot line is represented by a dashed line.

A drive shaft of the engine 110 can be connected to an input shaft of a torque transmission mechanism 121. An internal combustion engine such as a diesel engine which generates a driving force by using a fuel other than electricity can be used as the engine 110.

A drive shaft of the motor generator 111 can be connected to another input shaft of the torque transmission mechanism 121. The motor generator 111 can perform both driving operations of electric (assist) driving and a power generating operation. An interior permanent magnet (IPM) motor, in which a magnet is embedded in a rotor, can be used as an example of the motor generator 111.

The torque transmission mechanism 121 can have two input shafts and one output shaft. A drive shaft of a main pump 122 can be connected to the output shaft.

In a case where a large load is added to the main pump 122, the motor generator 111 can perform an assisting operation and a driving force of the motor generator 111 can be transmitted to the main pump 122 via the torque transmission mechanism 121. In this manner, the load that is added to the engine 110 can be reduced. In a case where a small load is added to the main pump 122, the driving force of the engine 110 can be transmitted to the motor generator 111 via the torque transmission mechanism 121 such that the motor generator 111 can perform the power generating operation.

The main pump 122 can supply hydraulic pressure to a control valve 124 via a high-pressure hydraulic line 123. The control valve 124 can distribute the hydraulic pressure to hydraulic motors 109A and 109B, the boom cylinder 104, the arm cylinder 106, and the bucket cylinder 108 according to a command from a driver. The hydraulic motors 109A and 109B can respectively drive two right and left crawlers of the lower traveling body 100 (FIG. 11).

The motor generator 111 can be connected to a storage circuit 112 via an inverter 113A. The slewing motor 102 can be connected to the storage circuit 112 via an inverter 113B. The inverters 113A and 113B and the storage circuit 112 can be controlled by a control device 135.

The inverter 113A can control the driving of the motor generator 111 based on a command from the control device 135. Switching between the assisting operation and the power generating operation of the motor generator 111 can be performed by the inverter 113A.

Required power can be supplied to the motor generator 111 through the inverter 113A from the storage circuit 112 during a period of the assisting operation of the motor generator 111. Power generated by the motor generator 111 can be supplied to the storage circuit 112 through the inverter 113A during a period of the power generating operation of the motor generator 111. In this manner, the storage device 115 in the storage circuit 112 can be charged. The storage device according to the further embodiment can be used as the storage device 115 in the storage circuit 112.

The slewing motor 102 can be AC-driven by the inverter 113B, and can perform both driving of a running operation and a regenerative operation. An IPM motor can be used as an example of the slewing motor 102. Power can be supplied from the storage circuit 112 via the inverter 113B to the slewing motor 102 during the running operation of the slewing motor 102. The slewing motor 102 can revolve the upper revolving body 101 (FIG. 11) via a reduction gear 131. During the regenerative operation, a rotational motion of the upper revolving body 101 can be transmitted to the slewing motor 102 via the reduction gear 131, and thus the slewing motor 102 can generate regenerated electric power. The regenerated electric power that is generated can be supplied to the storage circuit 112 via the inverter 113B. In this manner, the storage device 115 in the storage circuit 112 can be charged.

A resolver 132 can detect a position of a rotating shaft of the slewing motor 102 in a direction of rotation. A result of the detection by the resolver 132 can be input into the control device 135. The positions of the rotating shaft in the direction of rotation can be detected before the driving of the slewing motor 102 and after the driving of the slewing motor 102, and thus a revolving angle and a revolving direction can be derived.

A mechanical brake 133 can be connected to the rotating shaft of the slewing motor 102 and can generate a mechanical braking force. Switching between a braking state and a release state of the mechanical brake 133 can be performed by an electromagnetic switch controlled by the control device 135.

A pilot pump 125 can generate required pilot pressure in a hydraulic operation system. The pilot pressure that is generated can be supplied to an operating device 128 via a pilot line 126. The operating device 128 can have a lever and a pedal, and can be operated by the driver. The operating device 128 can convert a primary side hydraulic pressure that is supplied from the pilot line 126 to a secondary side hydraulic pressure according to the operation by the driver. The secondary side hydraulic pressure can be transmitted to the control valve 124 via a hydraulic line 129 and can be transmitted to a pressure sensor 127 via the other hydraulic line 130.

A pressure detection result that is detected by the pressure sensor 127 can be input into the control device 135. In this manner, the control device 135 can detect operation situations of the lower traveling body 100, the slewing motor 102, the boom 103, the arm 105, and the bucket 107 (FIG. 11).

During the operation and the traveling, the upper revolving body 101 of the operating machine is more likely to vibrate than transportation vehicles in general. Accordingly, the storage device 115 that is placed on the upper revolving body 101 can also vibrate to be subjected to shocks. In this embodiment, the storage device according to the further embodiment can be used as the storage device 115, and thus high reliability can be ensured against the vibrations and the shocks.

Certain embodiments of the present invention have been described above. However, the present invention is not limited thereto. For example, it will be apparent to those skilled in the art that various modifications, improvements, combinations, and the like can be added thereto.

It should be understood that the invention is not limited to the above-described embodiment, but may be modified into various forms on the basis of the spirit of the invention. Additionally, the modifications are included in the scope of the invention.

What is claimed is:

1. An operating machine comprising:
a lower traveling body;
an upper revolving body that is placed, in a revolvable manner, on the lower traveling body;
a slewing motor that revolves the upper revolving body; and
a storage device that supplies power to the slewing motor,
wherein the storage device includes
 a plurality of storage cells that are connected in series with each other,
 a housing that accommodates the storage cells,
 a plurality of mounting substrates that are accommodated in the housing and are stacked on each other, and
 voltage equalization circuits that are respectively connected to a pair of terminals of the storage cells and equalize an inter-terminal voltage of the storage cells, and
wherein the plurality of voltage equalization circuits are mounted, in a distributed manner, on the plurality of mounting substrates.

2. The operating machine according to claim 1,
wherein the storage device further includes an accommodation container in which the plurality of mounting substrates are accommodated, and an opening portion, which is directed to be orthogonal to a stacking direction of the mounting substrates, is disposed, and
wherein the accommodation container is accommodated in the housing.

3. The storage device according to claim 2,
wherein the housing has an open portion, and
wherein the storage device further includes:
a substrate side connector that is directed in a direction of the open portion and in the direction of the opening portion and is connected to the voltage equalization circuit; and
a current path that connects the storage cell to the substrate side connector.

4. The operating machine according to claim 2,
wherein the accommodation container has a mounting portion that protrudes outside from an edge of the opening portion and is fixed to the housing via the mounting portion.

5. The operating machine according to claim 2,
wherein the storage device further includes a spacer that is arranged between the plurality of mounting substrates and fixes a gap between the mounting substrates.

* * * * *